US005670037A

United States Patent [19]

Zaiting et al.

[11] Patent Number: 5,670,037

[45] Date of Patent: Sep. 23, 1997

[54] PROCESS FOR PRODUCING LIGHT OLEFINS BY CATALYTIC CONVERSION OF HYDROCARBONS

[75] Inventors: Li Zaiting; Xie Chaogang; Shi Wenyuan; Jiang Fukang; Liu Shunhua; Pan Rennan; Li Shichun, all of Beijing, China

[73] Assignees: China Petro-Chemical Corporation; Research Institute of Petroleum Processing, SINOPEC, both of Beijing, China

[21] Appl. No.: 232,605

[22] Filed: Apr. 25, 1994

[30] Foreign Application Priority Data

Nov. 5, 1993 [CN] China ................................ 93119748.1

[51] Int. Cl.$^6$ .................................................. C10G 11/02

[52] U.S. Cl. ......................... 208/114; 208/113; 585/651; 585/653

[58] Field of Search .................................... 208/111, 113, 208/114; 585/651, 648, 653

[56] References Cited

U.S. PATENT DOCUMENTS

| | | | |
|---|---|---|---|
| 3,443,892 | 5/1969 | Wacks et al. | 23/113 |
| 3,541,179 | 11/1970 | Okagami et al. | 260/683 |
| 3,647,682 | 3/1972 | Rabo et al. | 208/120 |
| 3,702,886 | 11/1972 | Argauer et al. | 423/328 |
| 3,725,485 | 4/1973 | Martini | 260/621 |
| 3,758,403 | 9/1973 | Rosinski et al. | 208/120 |
| 3,839,485 | 10/1974 | Wrisberg et al. | 260/683 |
| 4,044,065 | 8/1977 | Butter et al. | 260/677 |
| 4,087,350 | 5/1978 | Kolombos et al. | 208/121 |
| 4,111,793 | 9/1978 | Kolombos et al. | 208/121 |
| 4,171,257 | 10/1979 | O'Rear et al. | 208/120 |
| 4,172,816 | 10/1979 | Pop et al. | 208/120 |
| 4,172,856 | 10/1979 | Spencer et al. | 585/640 |
| 4,175,114 | 11/1979 | Plank et al. | 423/329 |
| 4,238,367 | 12/1980 | Bertus et al. | 252/455 |
| 4,242,237 | 12/1980 | Gladrow et al. | 252/455 |
| 4,243,556 | 1/1981 | Blanton, Jr. | 252/455 |
| 4,251,348 | 2/1981 | O'Rear et al. | 208/61 |
| 4,274,982 | 6/1981 | Chu | 252/455 |
| 4,282,085 | 8/1981 | O'Rear et al. | 208/120 |
| 4,309,280 | 1/1982 | Rosinski et al. | 208/120 |
| 4,340,465 | 7/1982 | Miller et al. | 208/120 |
| 4,374,294 | 2/1983 | Chu | 585/466 |
| 4,391,739 | 7/1983 | Chu | 252/455 |
| 4,399,059 | 8/1983 | Chu | 252/455 |
| 4,401,555 | 8/1983 | Miller | 208/111 |
| 4,416,766 | 11/1983 | Mulaskey | 208/135 |
| 4,440,868 | 4/1984 | Hettinger, Jr. et al. | 502/65 |
| 4,440,871 | 4/1984 | Lok et al. | 502/214 |
| 4,452,907 | 6/1984 | Ball et al. | 502/60 |
| 4,483,764 | 11/1984 | Hensley, Jr. et al. | 208/111 |
| 4,504,382 | 3/1985 | Pine | 208/114 |
| 4,578,371 | 3/1986 | Rieck et al. | 502/71 |
| 4,605,637 | 8/1986 | Chang et al. | 502/64 |
| 4,654,138 | 3/1987 | Derouane et al. | 208/114 |
| 4,658,081 | 4/1987 | Kolts | 585/651 |
| 4,692,236 | 9/1987 | Sato et al. | 208/114 |
| 4,757,040 | 7/1988 | Guan et al. | 502/63 |
| 4,826,804 | 5/1989 | Shamshoum | 502/214 |
| 4,837,000 | 6/1989 | Takatsu et al. | 423/328 |
| 4,839,319 | 6/1989 | Schuette et al. | 502/64 |
| 4,913,796 | 4/1990 | Valyocsik | 208/46 |
| 4,943,434 | 7/1990 | Miller | 423/328 |
| 4,966,680 | 10/1990 | Avidan et al. | 208/113 |
| 4,970,183 | 11/1990 | Nakamoto et al. | 502/68 |
| 4,977,122 | 12/1990 | Eberly | 502/69 |
| 4,980,053 | 12/1990 | Li et al. | 208/120 |
| 5,002,653 | 3/1991 | Kennedy et al. | 208/118 |
| 5,023,066 | 6/1991 | Gimpel et al. | 423/328 |
| 5,023,220 | 6/1991 | Dight et al. | 502/65 |
| 5,026,935 | 6/1991 | Leyshon et al. | 585/315 |
| 5,026,936 | 6/1991 | Leyshon et al. | 585/315 |
| 5,026,943 | 6/1991 | Rubin et al. | 585/467 |
| 5,043,522 | 8/1991 | Leyshon et al. | 585/651 |
| 5,059,735 | 10/1991 | Nemet-Mavrodin | 585/418 |
| 5,069,776 | 12/1991 | Biswas et al. | 208/120 |
| 5,077,253 | 12/1991 | Chu et al. | 502/61 |
| 5,079,202 | 1/1992 | Kumar et al. | 502/68 |
| 5,095,166 | 3/1992 | Forschner et al. | 585/653 |
| 5,098,684 | 3/1992 | Kresge et al. | 423/277 |
| 5,102,643 | 4/1992 | Kresge et al. | 423/328 |
| 5,107,042 | 4/1992 | Gaffney et al. | 585/651 |
| 5,110,776 | 5/1992 | Chitnis et al. | 502/64 |
| 5,143,595 | 9/1992 | Thomas et al. | 208/111 |
| 5,149,421 | 9/1992 | Miller | 208/114 |
| 5,159,128 | 10/1992 | Forschner et al. | 585/653 |
| 5,171,921 | 12/1992 | Gaffney et al. | 585/653 |
| 5,232,675 | 8/1993 | Shu | 423/328 |
| 5,380,690 | 1/1995 | Zhicheng et al. | 502/65 |

FOREIGN PATENT DOCUMENTS

| | | | |
|---|---|---|---|
| 1031834 | 3/1989 | China . | |
| 1043520 | 7/1990 | China . | |
| 1072203 | 5/1993 | China . | |
| 0372632 | 6/1990 | European Pat. Off. . | |
| 152356 | 11/1981 | Germany . | |
| 225135 | 7/1985 | Germany . | |
| 60-222428 | 11/1985 | Japan . | |
| 410073 | 4/1974 | U.S.S.R. . | |
| 487927 | 1/1976 | U.S.S.R. . | |
| 523133 | 9/1976 | U.S.S.R. . | |
| 550173 | 4/1977 | U.S.S.R. . | |
| 559946 | 6/1977 | U.S.S.R. . | |
| 1214726 | 11/1984 | U.S.S.R. . | |
| 1574840 | 10/1980 | United Kingdom | C01B 33/28 |
| 2084552 | 4/1982 | United Kingdom . | |

*Primary Examiner*—Helane E. Myers
*Attorney, Agent, or Firm*—Hedman, Gibson & Costigan, P.C.

[57] ABSTRACT

A process for producing light olefins, especially ethylene, propylene, isobutylene and isoamylene, together with high octane gasoline as by-product, comprises that petroleum hydrocarbons are contacted with phosphorus and rare earth containing high silica zeolite having a structure of pentasil catalysts and catalytically converted at a temperature of 480° to 680° C. and a pressure of $1.2\times10^5$ to $4.0\times10^5$Pa, with a contact time of 0.1 to 6 seconds, a weight ratio of catalyst to feedstock of 4:1 to 20:1 and a weight ratio of steam to feedstock of 0.01:1 to 0.5:1.

17 Claims, No Drawings

PROCESS FOR PRODUCING LIGHT OLEFINS BY CATALYTIC CONVERSION OF HYDROCARBONS

FIELD OF THE INVENTION

The present inventino relates to a process of catalytic conversion of petroleum hydrocarbons, and most particularly to a process for producing light olefins, especially ethylene, propylene, isobutylene and isoamylene together with high octane gasoline as by-product by catalytic conversion of petroleum hydrocarbons using phosphorus and rare earth containing high silica zeolite having a structure of pentasil catalysts.

DESCRIPTION OF THE PRIOR ART

The light olefins can be produced from petroleum hydrocarbons. Their production methods include tubular furnace pyrolysis by using light natural gas, naphtha or light gas oil as feedstocks, thermal cracking over heat carrier by using heavy hydrocarbons as feedstocks, and catalytic conversion of lower aliphatic alcohol as feedstocks. The conventional catalytic cracking also produces light olefins as by-products with a yield of only less than 15% by weight of feedstock during the production of gasoline and light cycle oil.

Recently, investigations for catalysts which are more effective for converting petroleum hydrocarbons to light olefins have been made and the result of the investigations has been reported in various patents. The production of light olefins using oxides supported metal catalysts, wherein the support can be $SiO_2$, $Al_2O_3$, or other oxides and the metal components are mainly selected from elements of IIB, VB, VIIB, and VIII groups, as disclosed in U.S. Pat. Nos. 3,541,179 and 3,647,682; D.D.NO.225,135 and S.U.NO.1,214,726. As the supported metal possesses dehydrogenation ability, it accelerates the aromatics condensation and coke formation reaction during the cracking reaction process. Hence, these types of catalysts can only be used for processing light hydrocarbons.

Potassium vanadate, potassium stannate, or potassium niobate is used as catalyst for cracking gasoline to obtain approximately 56% by weight of $C_2$–$C_4$ olefins, wherein ethylene yield is 36.5% by weight and propylene yield is 12.5% by weight, as disclosed in S.U.Nos.523,133, 487,927 and 410,073. D.D.No.152,356 discloses a method for producing light olefins by cracking of various liquid hydrocarbons or hydrocarbon fractions including gasoline, kerosene, gas oil, or vacuum distillates, by a fixed or moving bed reactor, using amorphous silica-alumina catalysts at a temperature of 600° to 800° C. and a contact time of 0.3 to 0.7 seconds, with $C_2$–$C_4$ olefins yield of 40–55% by weight. JP 60-222,428 discloses a process using ZSM-5 zeolite as catalyst and $C_5$–$C_{25}$ paraffinic hydrocarbons as feedstocks. The process is carried out at a temperature of 600°60 to 750° C. and a weight space velocity of 20 to 300 per hour, with a $C_2$–$C_4$ olefins yield of roughly 30% by weight. These above processes involve high cracking temperature, and hydrocarbon feedstocks which are limited by relatively narrow boiling ranges.

U.S. Pat. No. 3,758,403 discloses a method using mixed ZSM-5 zeolite and REY zeolite as catalyst, under catalytic cracking conditions to enhance the octane number and yield of gasoline product and obtain higher light olefins yield than that of using single REY zeolite as catalyst. In the example of said patent, vacuum gas oil boiling range from 220° to 510° C. is used as feedstock, and is dealt with at the temperature of about 483° C., the volume space velocity of 4 per hour and catalyst-to-feedstock ratio of 1.5:1, to obtain yields of 10–15% by weight for propylene and butylene. In U.S. Pat. No. 4,980,053 and EP.No.305,720A, the present applicants disclose a process for the production of light olefins by cracking of petroleum hydrocarbons including gasoline, kerosene, vacuum gas oil, or residual oil in a fluidized or moving bed or dense phase transfer line reactor using pentasil shape selective molecular sieves ad/or ultrastable hydrogen Y zeolites containing catalyst at a temperature of 500° to 650° C., with a weight space velocity of 0.2 to 20 per hour and catalyst-to-feedstock ratio of 2:1 to 12:1, to obtain a $C_2$–$C_4$ olefins yield of about 40% by weight. In CN No.1072203 A, the present applicants also disclose a process for producing LPG and high octane gasoline by cracking of petroleum hydrocarbons including gasoline, kerosene, vacuum gas oil, or residual oil in a riser or fluidized bed reactor using ZSM-5 zeolite, high silica Y zeolite and REY zeolite as catalyst at a temperature of 480° to 550° C., with a weight space velocity of 1 to 150 per hour and catalyst-to-feedstock ratio of 4:1 to 15:1, to obtain a propylene and butylene yield of 20 –30% by weight.

The object of the present invention is to provide a catalytic conversion process for producing light olefins, especially ethylene, propylene, isobutylene, and isoamylene together with high octane gasoline as by-product from petroleum hydrocarbons in riser or downflow transfer line reactor or fluidized bed reactor, using phosphorus and rare earth containing high silica zeolite having a structure of pentasil catalysts under given operating conditions.

Other objects of the present invention can be learned from the content of the specification of the present invention including the claims.

SUMMARY OF THE INVENTION

A process for producing light olefins, especially ethylene, propylene, isobutylene and isoamylene together with high octane gasoline as by-product, by catalytic conversion of petroleum hydrocarbons comprises contacting the petroleum hydrocarbons with phosphorus and rare earth containing high silica zeolite having a structure of pentasil catalysts in a moving catalyst reactor and reacting at a temperature of 480° to 680° C. and a pressure of $1.2\times10^5$ to $4.0\times10^5$Pa, with a contact time of 0.1 to 6 seconds, a weight ratio of catalyst to feedstock of 4:1 to 20:1 and a weight ratio of steam to feedstock of 0.01:1 to 0.5:1. The reaction effluent is separated to obtain light olefins and liquid products, the spent catalyst is stripped and then removed to a regenerator where it is contacted with an oxygen containing gas at a temperature of 600° to 800° C. and is regenerated, the regenerated catalyst is stripped and then recycled to the reactor for reuse.

DETAILED DESCRIPTION OF THE INVENTION

The step of the process provided by the present invention is as follows: preheated hydrocarbon feedstocks are contacted with hot phosphorus and rare earth containing high silica zeolite having a structure of pentasil catalysts in the riser or downflow transfer line reactor or fluidized bed reactor and catalytically converted under given operating conditions. The reaction effluent, steam and spent catalyst are separated by rapid gas-solid separation, the reaction effluent is continuously separated to obtain light olefins and liquid products, and the spent catalyst is continuously removed to stripper. After stripped by steam, the spent catalyst is removed to a regenerator where it is contacted with an oxygen containing gas and is regenerated, the hot regenerated catalyst is stripped and then recycled to the reactor for reuse.

(1) The Catalyst

Catalyst used in the present invention is consisting of 0–70% by weight of clay, 5–90% by weight of inorganic oxides and 10–35% by weight of zeolites. Wherein said clay is selected from kaolin and/or halloysite, said inorganic oxide is selected from $SiO_2.Al_2O_3$, $SiO_2$ and/or $Al_2O_3$, said zeolite components comprising 25–100% by weight of phosphorus and rare earth containing high silica zeolite having a structure of pentasil, 0–75% by weight of high silica Y type zeolite and 0–25% by weight of rare earth containing Y type zeolite.

High silica Y type zeolite used in the present invention is high Si/Al ratio, stabilised high silica Y type zeolite with rare earth content of 0–3% by weight (calculated as $RE_2O_3$) treated with various chemical and/or physical methods, such as hydrothermal method, acid treating method, framework silicon enriching method, and $SiCl_4$ treatment method.

Rare earth containing Y type zeolite used in the present invention is selected from rare earth exchanged Y type zeolite (REY) and/or rare earth-hydrogen-containing Y type zeolite (REHY).

Phosphorus and rare earth containing high silica zeolite having a structure of pentasil (designated as P-ZRP hereinafter) used in the present invention is a rare earth containing high silica zeolite having a structure of pentasil modified by aluminium phosphate, with a phosphorus content of 2–20% by weight (calculated as $P_2O_5$), preferably 2–10% by weight.

Above said rare earth containing high silica zeolite having a structure of pentasil (commercial name ZRP) is prepared according to the method disclosed in U.S. Pat. No. 5,232,675 or EP 0550917 A, using water glass, aluminium phosphate and inorganic acid as raw materials, and REY or REHY zeolite as crystalline seeds, and is crystallised at 130°–200° C. for 12–60 hours. ZRP zeolite possesses an X-ray diffraction pattern of ZSM-5 zeolite family and an anhydrous chemical composition formula: 0.01–0.30 $RE_2O_3$.0.4–1.0 $Na_2O.Al_2O_3$.20–60 $SiO_2$, in where, the rare earth comes from the seeds used for the synthesis of ZRP zeolite. ZRP zeolite is a 2–4 times higher adsorption capacity ratio of normal hexane to cyclohexane adsorption than that of ZSM-5 zeolite. ZRP zeolite was modified by aluminium, phosphate as follows: the zeolite was pre-exchanged with ammonium ion to decrease its sodium content to a level of not more than 0.1% by weight (calculated as $Na_2O$), then mixed homogeneously with an aluminium phosphate sol having a composition of $Al_2O_3$:$P_2O_5$=1:1–3 according to a weight ratio of $P_2O_5$: zeolite (anhydrous basis)=1:5–99, followed by calcining at 300°–600° C. for 0.5–6 hours in the presence of 10–100% steam.

(2) The Feed

Hydrocarbon feedstocks in accordance with the present invention, which may vary in a wide range, comprise petroleum fractions with different boiling ranges, such as naphtha, distillate, vacuum gas oil, residual oil and the mixture thereof. Crude oil may also be directly used.

The pattern of feed injection into reactor can use single point injection or multi-point injection.

(3) Process and Operating Conditions thereof

The process provided by the present invention comprises: petroleum hydrocarbons are preheated and then injected into the riser or downflow transfer line reactor or fluidized bed reactor, in where petroleum hydrocarbons are contacted with hot phosphorus and rare earth containing high silica zeolite having a structure of pentasil catalysts and catalytically converted at a temperature of 480° to 680° C., preferably from 500° to 620° C., a pressure of $1.2\times10^5$ to $4.0\times10^5$Pa, with a contact time of 0.1 to 6 seconds, preferably from 0.1 to 5 seconds, a weight ratio of catalyst to feedstock of 4:1 to 20:1, preferably from 5:1 to 15:1 and a weight ratio of steam to feedstock of 0.01:1 to 0.5:1, preferably from 0.05:1 to 0.3:1. The reaction effluent, steam and spent catalyst are separated by rapid gas-solid separation, the reaction effluent is continuously separated to obtain light olefins including ethylene, propylene, isobutylene, isoamylene, etc. and liquid products, and the spent catalyst is continuously removed to stripper. After stripped by steam and/or other gas, hydrocarbon products which are adsorbed on the catalysts are stripped out. The spent catalyst with coke deposited thereon is then removed to a regenerator. Regeneration is conducted by contacting the catalyst with an oxygen-containing gas, such as air, at a temperature of 600° to 800° C. After stripped by steam and/or other gas, the hot regenerated catalyst is recycled to the reactor for reuse. Hot regenerated catalyst supplies catalytic conversion of petroleum hydrocarbon with the needed reactive heat. And after reaction the spent catalyst is regenerated in the regenerator to emit heat which will be absorbed by the regenerated catalyst. After the regenerated catalyst is returned to reactor, it further supplies the catalytic conversion of petroleum hydrocarbons with the absorbed heat.

The advantages of the present invention are as follows:

1. In a comparison with conventional catalytic cracking processes, the process provided by the present invention uses phosphorus and rare earth containing high silica zeolite having a structure of pentasil catalysts with lower hydrogen transfer activity and higher olefin selectivity, thus increases the yields of light olefins, especially propylene, isobutylene and isoamylene.

2. In a comparison with prior catalytic conversion processes for producing light olefins, the process provided by the present invention uses dilute phase transfer line reactor and phosphorus are rare earth containing high silica zeolite having a structure of pentasil catalyst with higher cracking activity and higher olefin selectivity, thus increases the yields of light olefins, especially propylene, isobutylene and isoamylene.

3. The process of the present invention provides the suitable catalysts, reactor model and operating conditions, thus obtains higher yields of high olefins, especially isoolefins, wherein isobutylene yield is 6.75% by weight and isoamylene yield is 6.52% by weight.

4. The feedstocks used in the process of the present invention possess very wide boiling ranges, may comprise petroleum fractions with different boiling ranges, such as naphtha, distillate, vacuum gas oil, residual oil and the mixture thereof, crude oil may also be directly used.

The following examples will serve to further illustrate the catalytic conversion process provided by the present invention. However, these examples are not to be construed to limit the scope of the present invention.

The main properties of feedstocks used in the following examples are listed in Table 1.

TABLE 1

| Feedstock | A | B | C | D | E | F | G | Crude oil |
|---|---|---|---|---|---|---|---|---|
| Density (20° C.), g/ml | .881 | .904 | .856 | .923 | .726 | .816 | .873 | .857 |
| Conradson carbon, wt % | 0.26 | 0.16 | 0.22 | 0.35 | — | — | 4.78 | 3.54 |
| Basic nitrogen, ppm | 537 | 585 | 420 | 683 | — | — | 837 | 623 |
| Ni content, ppm | 0.08 | 1.41 | 0.49 | 3.62 | — | — | 8.92 | 6.28 |
| V content, ppm | 0.01 | 0.05 | 0.03 | 0.45 | — | — | 0.72 | 0.50 |
| UOP K factor | 12.0 | 11.8 | — | 11.4 | — | — | — | — |
| Distillation range, °C. | 256–545 | 243–507 | 319–504 | 241–540 | 54–228 | 235–364 | >346 | — |

The catalysts used in these examples are as follows:

Catalyst A was prepared according to the method of example 3 disclosed in U.S. Ser. No. 08/072,771 (filed on Jun. 7, 1993) or Netherland Ser. No.9301333. It was consisting of 15.0% by weight of P-ZRP zeolite, 59.5% by weight of kaolin and 25.5% by weight of $Al_2O_3$.

Catalyst B was prepared according to the method of example 5 disclosed in U.S. Ser. No. 08/072,771 (filed on Jun. 7, 1993) or Netherland Ser. No.9301333. It was consisting of 18.0% by weight of P-ZRP zeolite and balance amounts of amorphous aluminosilcate ($SiO_2.Al_2O_3$).

Catalyst C was prepared according to the method of example 7 disclosed in U.S. Ser. No. 08/072,771 (filed on Jun. 7, 1993) or Netherland Ser. N.9301333. It was consisting of 16.2% by weight of P-ZRP zeolite, 1.8% by weight of REY zeolite, 57.4% by weight of kaolin and 24.6% by weight of $Al_2O_3$.

Catalyst D was prepared according to the preparation method of conventional semi-synthetic cracking catalyst. It was consisting of 12.0% by weight of P-ZRP zeolite, 8% by weight of REUSY zeolite (wherein $RE_2O_3$ content≦3% by weight), 54.5% by weight of kaolin and 25.5% by weight of $Al_2O_3$.

Catalyst E was prepared according to the preparation method of conventional semi-synthetic cracking catalyst. It was consisting of 10% by weight of P-ZRP zeolite, 10% by weight of USY zeolite, 2% by weight of REY zeolite, 59.3% by weight of kaolin and 18.7% by weight of $Al_2O_3$.

Catalyst F was prepared according to the preparation method of conventional semi-synthetic cracking catalyst. It was consisting of 10.0% by weight of P-ZRP zeolite, 10.0% by weight of high silica Y type zeolite (prepared with liquid phase framework silicon enriching method), 2.0% by weight of REY zeolite, 59.3% by weight of kaolin and 18.7% by weight of $Al_2O_3$.

Catalyst H was prepared according to the preparation method of conventional semi-synthetic cracking catalyst. It was consisting of 8.0% by weight of P-ZRP zeolite, 8.0% by weight of REUSY zeolite, 4.0% by weight of USY zeolite, 56.5% by weight of kaolin and 23.5% by weight of $Al_2O_3$ and $SiO_2$.

EXAMPLE 1

This example illustrates the process provided by the present invention for producing light olefins by using single zeolite (P-ZRP) containing catalyst with semi-synthetic matrix.

The catalyst conversion was carried out in a bench scale fixed-fluidized bed reactor with Feedstock A and Catalyst A at the temperature of 580° C. and the pressure of $1.3\times10^5$Pa, with the contact time of 5 seconds, the weight ratio of catalyst to feedstock of 5:1 and the weight ratio of steam to feedstock of 0.2:1. The results of the test were listed in Table 2.

COMPARATIVE EXAMPLE 1

H-ZSM-5 zeolite was used instead of P-ZRP zeolite to prepare a catalyst as Comparative Sample 1. Table 2 also lists the results of the test with Comparative Sample 1 at the same operating conditions as Example 1.

The results in Table 2 show that: under the same operating condition, the process provided by the present invention displayed in higher yields of light olefins, especially propylene, isobutylene and isoamylene.

TABLE 2

| | Catalyst A | Comparative Sample 1 |
|---|---|---|
| Product Yield, wt % | | |
| Cracking gas | 51.02 | 43.81 |
| Wherein, ethylene | 6.16 | 4.36 |
| propylene | 19.74 | 16.70 |
| total butylene | 13.71 | 12.52 |
| isobutylene | 5.92 | 5.18 |
| Gasoline ($C_5$ ~ 221° C.) | 28.80 | 30.64 |
| Wherein, total amylene | 5.38 | 4.63 |
| isoamylene | 3.62 | 3.08 |
| Diesel (221 ~ 330° C.) | 6.60 | 7.34 |
| Bottoms (>330° C.) | 7.22 | 11.99 |
| Coke | 6.36 | 6.22 |
| Conversion, wt % | 86.18 | 80.67 |
| $C_2$ ~ $C_5$ olefins, wt % | 44.99 | 38.21 |
| Isobutylene plus isoamylene, wt % | 9.54 | 8.26 |

EXAMPLE 2

This example illustrates the process provided by the present invention for producing light olefins by using single zeolite (P-ZRP) containing catalyst with full-synthetic matrix.

The catalytic conversion was carried out in a bench scale fixed-fluidized bed reactor with Feedstock A and Catalyst B at the same operating conditions as Example 1. The results of the test are listed in Table 3.

TABLE 3

| | Catalyst B |
|---|---|
| Product Yield, wt % | |
| Cracking gas | 55.30 |
| Wherein, ethylene | 6.20 |

TABLE 3-continued

| | Catalyst B |
|---|---|
| propylene | 18.32 |
| total butylene | 13.11 |
| isobutylene | 5.38 |
| Gasoline ($C_5$ ~ 221° C.) | 26.50 |
| Wherein, total amylene | 4.90 |
| isoamylene | 3.25 |
| Diesel (221 ~ 330° C.) | 7.77 |
| Bottoms (>330° C.) | 3.65 |
| Coke | 6.78 |
| Conversion, wt % | 88.58 |
| $C_2$ ~ $C_5$ olefins, wt % | 42.53 |
| Isobutylene plus isoamylene, wt % | 8.63 |

EXAMPLE 3

This examples illustrates the process provided by the present invention for producing light olefins by using dual zeolites (P-ZRP and REY) containing catalyst.

The catalytic conversion was carried out in a bench scale fixed-fluidized bed reactor with Feedstock B and Catalyst C at the same operating conditions as Example 1. The results of the test are listed in Table 4.

COMPARATIVE EXAMPLE 2

H-ZSM-5 zeolite was used instead of P-ZRP zeolite to prepare. Table 4 also lists the results of the test with Comparative Sample 2 at the same operating conditions as Example 3.

The results in Table 4 show that: under the same operating conditions the process provided by the present invention possessed in higher yields of light olefins, especially propylene, isobutylene and isoamylene.

TABLE 4

| | Catalyst C | Comparative Sample 2 |
|---|---|---|
| Product Yield, wt % | | |
| Cracking gas | 49.24 | 41.54 |
| Wherein, ethylene | 5.32 | 2.85 |
| propylene | 18.31 | 15.48 |
| total butylene | 13.47 | 12.36 |
| isobutylene | 5.49 | 4.99 |
| Gasoline ($C_5$ ~ 221° C.) | 27.61 | 28.62 |
| Wherein, total amylene | 4.99 | 4.58 |
| isoamylene | 3.32 | 3.02 |
| Diesel (221 ~ 330° C.) | 7.32 | 9.94 |
| Bottoms (>330° C.) | 8.22 | 12.45 |
| Coke | 7.61 | 7.45 |
| Conversion, wt % | 84.46 | 77.61 |
| $C_2$ ~ $C_5$ olefins, wt % | 42.09 | 35.27 |
| Isobutylene plus isoamylene, wt % | 8.81 | 8.01 |

EXAMPLE 4

This example illustrates the process provided by the present invention for producing light olefins by using P-ZRP zeolite, USY zeolite and REUSY zeolite containing catalyst.

The catalytic conversion was carried out in a bench scale fixed-fluidized bed reactor with Feedstock B and Catalyst G at the temperature of 500° C. and the pressure of $1.4 \times 10^5$Pa, with the contact time of 1.5 seconds, the weight ratio of catalyst to feedstock of 6:1 and the weight ratio of steam to feedstock of 0.05:1. The results of the test are listed in Table 5.

TABLE 5

| | Catalyst G |
|---|---|
| Product Yield, wt % | |
| Cracking gas | 42.15 |
| Wherein, ethylene | 3.45 |
| propylene | 14.14 |
| total butylene | 10.28 |
| isobutylene | 4.31 |
| Gasoline ($C_5$ ~ 221° C.) | 39.70 |
| Wherein, total amylene | 5.27 |
| isoamylene | 3.68 |
| Diesel (221 ~ 330° C.) | 8.53 |
| Bottoms (>330° C.) | 4.57 |
| Coke | 5.05 |
| Conversion, wt % | 86.90 |
| $C_2$ ~ $C_5$ olefins, wt % | 33.14 |
| Isobutylene plus isoamylene, wt % | 7.99 |

EXAMPLE 5

This example illustrates the process provided by the present invention for producing light olefins by using triple zeolite (P-ZRP, high silica Y type and REY) containing catalyst.

The catalytic conversion were carried out in a bench scale fixed-fluidized bed reactor with Feedstock C and Catalyst E and F at the temperature of 515° C., with the weight space velocity of 14 per hour, the weight ratio of catalyst to feedstock of 8:1 and the weight ratio of steam to feedstock of 0.07:1. The results of the tests are listed in Table 6.

COMPARATIVE EXAMPLE 3

H-ZSM-5 zeolite was used instead of P-ZRP zeolite to prepare the catalyst as Comparative Sample 3, the catalyst was used in CN No.1072203 A. Table 6 also lists the results of the test with Comparative Sample 3 at the same operation conditions as Example 5.

The results in Table 6 show that: under the same operating conditions the process provided by the present invention possessed in higher yields of light olefins, especially isoolefins than the prior art (CN No.1072203A).

| | Catalyst E | Catalyst F | Comparative Sample 3 |
|---|---|---|---|
| Product Yield, wt % | | | |
| Cracking gas | 40.64 | 42.28 | 33.10 |
| Wherein, ethylene | 2.59 | 2.63 | 0.91 |
| propylene | 13.63 | 14.25 | 9.75 |
| total butylene | 11.53 | 12.38 | 7.45 |
| isobutylene | 4.95 | 5.33 | 2.53 |
| Gasoline ($C_5$ ~ 221° C.) | 41.63 | 40.45 | 47.00 |
| Wherein, total amylene | 6.29 | 6.42 | — |
| isoamylene | 4.38 | 4.51 | — |
| Diesel (221 ~ 330° C.) | 9.27 | 9.12 | 9.20 |
| Bottoms (>330° C.) | 4.82 | 4.63 | 5.30 |
| Coke | 3.64 | 3.52 | 5.40 |
| Conversion, wt % | 85.91 | 86.25 | 85.50 |
| $C_2$ ~ $C_4$ olefins, wt % | 27.75 | 29.26 | 18.11 |
| Isobutylene plus isoamylene, wt % | 9.33 | 9.84 | — |

EXAMPLE 6

This example illustrates the process provided by the present invention for production of light olefins by catalytic conversion of petroleum hydrocarbons in riser reactor.

The test was carried out on a pilot riser unit with continuous reaction and regeneration operation system using Feedstock A and Catalyst B and operated in the single pass operation mode. The feedstock was preheated to about 350° C. and then injected into the inlet of riser reactor, steam with high temperature was injected to the outlet of preheater and the inlet of riser reactor, the weight ratio of steam to feedstock was 0.1:1. The feedstock was contacted with heated catalyst in riser reactor and catalytically converted at riser reactor outlet temperature of 530° C. and the pressure of $1.7\times10^5$Pa with the contact time of 2.3 seconds and the weight ratio of catalyst to feedstock of 10:1. Reaction effluent, steam and spent catalyst were separated by rapid gas-solid separation in the outlet of riser reactor, reaction effluent was continuously separated to obtain light olefins including ethylene, propylene, isobutylene and isoamylene and liquid products, and spent catalyst was continuously removed to the stripper. After stripped by steam, the spent catalyst was removed to a regenerator where it was contacted with an oxygen containing gas and was regenerated, the hot regenerated catalyst was stripped and then recycled to the reactor for reuse. The results of the test are listed in Table 7.

The data in Table 7 show that: the process provided by the invention under catalytic cracking conditions possessed obviously higher isoolefin yields than conventional catalytic cracking process, in where isobutylene yield was 6.57% by weight and isoamylene yield was 6.52% by weight, besides, high octane gasoline with MON 82.0 and RON 95.4 was produced.

TABLE 7

| | Catalyst D |
|---|---|
| Product Yield, wt % | |
| Cracking gas | 35.93 |
| Wherein, ethylene | 2.52 |
| propylene | 12.45 |
| total butylene | 15.71 |
| isobutylene | 6.57 |
| Gasoline ($C_5$ ~ 221° C.) | 40.98 |
| Wherein, total amylene | 9.41 |
| isoamylene | 6.52 |
| Diesel (221 ~ 330° C.) | 12.06 |
| Bottoms (>330° C.) | 6.64 |
| Coke | 4.39 |
| Conversion, wt % | 81.30 |
| $C_2$ ~ $C_5$ olefins, wt % | 40.09 |
| Isobutylene plus isoamylene, wt % | 13.09 |
| Gasoline properties | |
| MON | 82.0 |
| RON | 95.5 |

EXAMPLE 7

This example illustrates that vaccume gas oil derived from various crude oils can be used as feedstock in the process provided by the present invention for producing light olefins.

The tests were carried out in a bench scale fixed-fluidized bed reactor by using Catalyst E at the temperature of 515° C., with the contact time of 1 second, the weight ratio of catalyst to feedstock of 8:1 and the weight ratio of steam to feedstock of 0.05:1. The results of the tests are listed in Table 8.

TABLE 8

| | Feedstock A | Feedstock B | Feedstock D |
|---|---|---|---|
| Product Yield, wt % | | | |
| Cracking gas | 44.09 | 42.93 | 37.32 |
| Wherein, ethylene | 3.26 | 3.05 | 2.21 |
| propylene | 15.05 | 14.35 | 12.28 |
| total butylene | 11.02 | 10.06 | 9.41 |
| isobutylene | 4.72 | 4.38 | 3.95 |
| Gasoline ($C_5$ ~ 221° C.) | 40.57 | 39.46 | 37.66 |
| Wherein, total aamylene | 6.06 | 5.51 | 5.03 |
| isoamylene | 4.25 | 3.83 | 3.48 |
| Diesel (221 ~ 330° C.) | 6.64 | 7.56 | 11.35 |
| Bottoms (>330° C.) | 2.96 | 4.12 | 7.28 |
| Coke | 5.74 | 5.93 | 6.39 |
| Conversion, wt % | 90.40 | 88.32 | 81.37 |
| $C_2$ ~ $C_5$ olefins, wt % | 35.39 | 32.97 | 28.93 |
| Isobutylene pllus isoamylene, wt % | 8.97 | 8.21 | 7.43 |

EXAMPLE 8

This example illustrates that hydrocarbons with different boiling ranges can be used as feedstock in the process provided by the present invention for producing light olefins.

The tests were carried out in a bench scale fixed-fluidized bed reactor by using Catalyst A. The operating conditions and the results of the tests are listed in Table 9.

TABLE 9

| | Feedstock E | Feedstock F | Feedstock G | Crude oil |
|---|---|---|---|---|
| Operating conditions | | | | |
| Temperature, °C. | 680 | 650 | 580 | 580 |
| Contact time, seconds | 0.5 | 0.1 | 6 | 5 |
| Catalyst/oil, wt/wt | 20:1 | 16:1 | 4:1 | 6:1 |
| Steam/oil, wt/wt | 0.15:1 | 0.01:1 | 0.5:1 | 0.3:1 |
| Product Yield, wt % | | | | |
| Cracking gas | 52.72 | 39.54 | 49.98 | 43.77 |
| Wherein, ethylene | 11.87 | 4.89 | 5.61 | 4.36 |
| propylene | 13.94 | 15.38 | 19.21 | 16.36 |
| total butylene | 10.52 | 8.78 | 14.56 | 12.47 |
| isobutylene | 3.58 | 3.48 | 5.82 | 5.03 |
| Gasoline ($C_5$ ~ 221° C.) | 43.59 | 40.27 | 25.18 | 33.35 |
| Wherein, total amylene | 4.77 | 4.46 | 5.71 | 4.72 |
| isoamylene | 3.09 | 2.87 | 3.80 | 3.12 |
| Diesel (221 ~ 330° C.) | 0.23 | 16.77 | 9.35 | 9.71 |
| Bottoms (>330° C.) | 0.00 | 0.04 | 6.84 | 4.48 |
| Coke | 3.46 | 3.38 | 8.65 | 8.69 |
| Conversion, wt % | 99.77 | 83.19 | 83.81 | 85.81 |
| $C_2$ ~ $C_5$ olefins, wt % | 41.10 | 33.51 | 45.09 | 37.91 |
| Isobutylene plus isoamylene, wt % | 6.67 | 6.35 | 9.60 | 8.15 |

What is claimed is:

1. A process for the catalytic conversion of a petroleum hydrocarbon feedstock comprising: catalytically converting said preheated hydrocarbons by contacting said preheated hydrocarbons with phosphorus and rare earth containing high silica zeolite having a structure of pentasil catalysts in a riser or downflow reactor at a temperature of 530° to 680° C. and a pressure of $1.2\times10^5$ to $4\times10^5$ Pa, with a contact time of 0.1 to 6 seconds, a weight ratio of catalyst to feedstock of 5:1 to 15:1 and a weight ratio of steam to feedstock of 0.01:1 to 0.5:1 to selectively produce light olefins comprising ethylene, propylene, isobutylene and isoamylene wherein said phosphorus and rare earth containing high silica zeolite having a structure of pentasil catalysts comprises a rear earth containing high silica zeolite having a structure of pentasil which has been pre-exchanged with ammonium ion to decrease its sodium content to a level of not more than 0.1% by weight, calculated as $Na_2O$, and homogeneously mixed with an aluminum phosphate sol having a composition of $Al_2$:$P_2O_5$=1:1–3 according to a weight ratio of $P_2O_5$:zeolite (anhydrous basis)=1:5–99, followed by calcination at 300°–600° C. for 0.5–6 hours in the presence of 10–100% steam.

2. The process of claim 1, wherein said catalytic conversion is carried out at a temperature of 530° to 620° C., with a contact time of 0.5 to 5 seconds, and a weight ratio of steam to feedstock of 0.05:1 to 0.3:1.

3. The process of claim 1, wherein said moving catalyst reactor is a riser reactor.

4. The process of claim 1, wherein said moving catalyst reactor is a downflow transfer line reactor.

5. The process of claim 1, wherein said catalyst consists of 0–70% by weight of a clay halloysite and mixtures thereof, 5–90% by weight of inorganic oxides selected from the group consisting of $SiO_2.Al_2O_3$, $SiO_2$, $Al_2O_3$ and mixtures thereof and 10–35% by weight of said zeolites.

6. The process of claim 5, wherein said zeolite components comprise 25–100% by weight of phosphorus and rare earth containing high silica zeolite, said phosphorus and rare earth containing high silica zeolite having a structure of pentasil, 0–75% by weight of high silica Y zeolites and 0–25% by weight of rare earth containing Y zeolites.

7. The process of claim 6, wherein said high silica Y zeolite is stabilized high silica Y zeolite with rare earth content of 0–3% by weight (calculated as $RE_2O_3$) treated by various chemical and/or physical methods.

8. The process of claim 6, wherein said rare earth containing Y type zeolite is selected from the group consisting of rare earth exchanged Y zeolite, rare earth-hydrogen containing Y zeolite and mixtures thereof.

9. The process of claim 6, wherein said phosphorus and rare earth containing high silica zeolite having a structure of pentasil comprises a phosphorus content of 2–20% by weight (calculated as $P_2O_5$).

10. The process of claim 6, wherein said phosphorus and rare earth containing high silica zeolite having a structure of pentasil comprises a phosphorus content of 2–10% by weight (calculated as $P_2O_5$).

11. The process of claim 9, wherein said rare earth containing high silica zeolite having a structure of pentasil possesses an X-ray diffraction pattern of ZSM-5 zeolite family and an anhydrous chemical composition formula: 0.01–0.30 $RE_2O_3$.0.4–1.0 $Na_2O.Al_2O_3$.20–60 $SiO_2$, wherein the rare earth comes from seeds used for the synthesis of the zeolite, and possesses a 2–4 times higher adsorption capacity ratio of normal hexane to cyclohexane adsorption than that of ZSM-5 zeolite.

12. The process of claim 9, wherein said rare earth containing high silica zeolite having a structure of pentasil is prepared by crystallizing raw materials comprising water glass, aluminum phosphate, and inorganic acid in the presence of REY or REHY zeolite as crystalline seeds at 130°–200° C. for 12–60 hours.

13. The process of claim 1, wherein said hydrocarbon feedstock comprises petroleum fractions with different boiling ranges, such as naphtha, distillate, vacuum gas oil, residual oil and mixtures thereof as well as crude oil.

14. The process of claim 1 comprising injecting said feedstock into said reactor by single point injection or by multipoint injection.

15. The process of claim 1, which further comprises separating the reaction effluent to obtain light olefins and liquid products, stripping spent catalyst and removing the stripped spent catalyst to a regenerator where the stripped spent catalyst is contacted with an oxygen containing gas at a temperature of 600° to 800° C. and is regenerated, stripping the regenerated catalyst and then recycling said regenerated and stripped catalyst to the reactor for reuse.

16. The process of claim 15, wherein said liquid products comprise high octane gasoline.

17. A process for the catalytically cracking a petroleum hydrocarbon feedstock to selectively produce light olefins comprising ethylene, propylene, isobutylene and isoamylene comprising: catalytically converting said preheated hydrocarbons to selectively produce ethylene, propylene, isobutylene and isoamylene by contacting said preheated hydrocarbons with phosphorus and rare earth containing high silica zeolite having a structure of pentasil catalysts in a riser or downflow reactor at a temperature of 530° to 680° C. and a pressure of $1.2\times10^5$ to $4\times10^5$ Pa, with a contact time of 0.1 to 6 seconds, a weight ratio of catalyst to feedstock of 5:1 to 15:1 and a weight ratio of steam to feedstock of 0.01:1 to 0.5:1 to selectively produce light olefins comprising ethylene, propylene, isobutylene and isoamylene wherein said phosphorus and rare earth containing high silica zeolite having a structure of pentasil catalysts comprises a rare earth containing high silica zeolite having a structure of pentasil which has been pre-exchanged with ammonium ion to decrease its sodium content to a level of not more than 0.1% by weight, calculated as $Na_2O$, and monogeneously mixed with an aluminum phosphate sol having a composition of $Al_2$:$P_2O_5$=1:1–3 according to a weight ratio of $P_2O_5$:zeolite (anhydrous basis)=1:5–99, followed by calcination at 300°–600° C. for 0.5–6 hours in the presence of 10–100% steam.

* * * * *